United States Patent [19]

Kim

[11] Patent Number: 5,445,195

[45] Date of Patent: Aug. 29, 1995

[54] AUTOMATIC COMPUTER-CONTROLLED LIQUID DISPENSER

[76] Inventor: Dae S. Kim, 49 Floral St., Newton, Mass. 02161

[21] Appl. No.: 913,855

[22] Filed: Jul. 15, 1992

[51] Int. Cl.$^6$ ............................................. G01F 11/16
[52] U.S. Cl. .................................... 141/104; 141/378;
141/69; 141/100; 222/137; 222/144.5; 222/244;
222/380; 366/190; 366/256; 366/605
[58] Field of Search ............... 141/100, 104, 192, 198,
141/69, 152, 144–147, 237, 238, 242–245,
258–262, 285, 286, 301, 302, 305, 369, 370, 378;
222/135, 137, 144, 144.5, 244, 246, 309, 333,
380; 366/184, 190, 255, 256, 332, 605

[56] References Cited

U.S. PATENT DOCUMENTS

| | | | |
|---|---|---|---|
| 1,544,122 | 6/1925 | Barclay | 222/380 X |
| 2,549,851 | 4/1951 | Pope | 222/383 X |
| 3,029,847 | 4/1962 | Baudhuin et al. | 141/104 |
| 3,066,830 | 12/1962 | Heiss et al. | 141/104 X |
| 3,097,672 | 7/1963 | Minard | 141/147 X |
| 3,236,270 | 2/1966 | Stutz | 141/104 |
| 3,850,345 | 11/1974 | Merritt | 141/147 X |
| 3,942,561 | 3/1976 | Stoeffler | 141/378 X |
| 4,314,653 | 2/1982 | Sindoni | 366/605 X |
| 4,911,212 | 3/1990 | Burton | 141/369 |
| 5,105,860 | 4/1992 | Connor | 141/369 X |
| 5,222,534 | 6/1993 | Wilkinson, Jr. | 141/378 X |

OTHER PUBLICATIONS

Decorating Retailer, Jan. 1992, pp. 19–34.
Auto Tint Advertisements, Jul. 1989 and Dec. 1986.
Accept User's Manual, undated.
Accept Advertisement, Mar. 1, 1992.
Kimat Paint Advertisements, undated.
Miller Accutinter Advertisements, undated.
Aquatrend II Article, undated.
Harbil Advertisement, undated.

*Primary Examiner*—J. Casimer Jacyna
*Attorney, Agent, or Firm*—Wolf, Greenfield & Sacks

[57] ABSTRACT

An extremely compact and accurate device for simultaneously dispensing a plurality of liquids in individually pre-set volumes having: (1) substantially identical radially arranged sets having: a positive displacement metering piston pump, a fluid reservoir which houses a tint, a stirrer, and a valve spring; (2) an interconnecting passage connects the sets to respective dispensing nozzles; (3) a drive plate which moves the pistons and the stirrers between two pre-determined vertical positions for pumping and mixing the fluid; (4) a value for controllably diverting individual liquids independently in predetermined amounts from normally returning from the pumps to the reservoirs to move instead from the pump to small circularly arranged discharge nozzles; (5) a mechanism for aligning paint containers for tint dispensing; and (6) a solvent saturation system for reducing evaporation of fluid.

19 Claims, 5 Drawing Sheets

AUTOMATIC COMPUTER-CONTROLLED LIQUID DISPENSER

BACKGROUND OF THE INVENTION

1. Field of the Invention

This invention relates to an automatic dispenser for a plurality of liquids. More specifically, the invention relates to an automatic computer controlled liquid colorant dispenser.

2. Description of the Prior Art

Since 1966 when the State of California passed Rule 66 which regulates solvent discharge into the air, many Federal and State environmental laws, including the recent Clean Air Act of 1990, have followed. These laws are changing the way we make, package, distribute, apply, and dispose of architectural paints, which are the most polluting consumer product after automobiles. For instance, one gallon of solvent (oil) based paint discharges more hydrocarbons into the air than a Cadillac discharges in nine months of driving. Therefore, use of solvent based paint is already banned in many areas in this country. Although the alternative water-borne latex paints cause less air pollution, they cause severe water pollution. Disposal of left-over paints, empty cans, and discarded applicators, as well as waste water or solvents from cleaning manufacturing equipment in factories and tools at job sites add more air, water and solid pollution.

In anticipation of ever tightening regulatory pressure on the paint industry, we have been developing a virtually non-polluting alternative technology, known as the EcoPainting System, for the last two decades. This system reduces the total pollutants to about one thousandth of those caused by conventional ways of making, packaging, applying and disposing of architectural paints. Many components of this system have been patented and are in the market.

This invention, named ACCEPT (Automatic Computer-Controlled EcoPaint Tinter), is the latest component of the EcoBatch paint making process, which is designed to produce an exact amount of paint of any gloss or color from four pre-dispersed ingredients in retail stores without creating any waste product. The EcoBatch process consists of computer controlled base making, tinting, and color matching, and EcoPackaging which is described in the U.S. Pat. Nos. 4,898,295, 4,977,724, and 5,016,755. We have separated the tinting machine portion of the EcoBatch paint maker from other parts and modified it for conventional paint retail store use.

In paint retail, four major new developments are helping the rapid growth of custom tinting and automation. A decade ago, standard packaged colors were the major portion of trade paint sales but presently they contribute to less than half. Firstly, the ever tightening governmental regulations are raising the cost of waste treatment. This regulatory and economic pressure forces the paint manufacturers to reduce the number of products or smaller batches to reduce cleaning and the resulting hazardous wastes. Secondly, the sophisticated tastes of baby boomers demand more variation than the usual twenty or so standard colors can provide. Thirdly recent advances in personal computers (PC) make PC-based store automation affordable to even a mom-and-pop store. Finally, the new emergence of low cost spectrophotometers and the color matching software are making custom tinting faster, easier and more affordable.

In a conventional custom tinting, a customer select a color from a sample color book or color chips, which tint manufacturer supplies with their tints as a part of their color system, such as the ColorTrend System by Nuodex Corporation. Using the number from that color chip, a clerk searches and copies the corresponding formula from a formula book which the paint manufacturer supply with tint bases. He dispenses the proper amounts of each tint into a can of base paint by setting metering pumps one at a time. After mixing the contents by shaking, he visually checks the color, then gives it to the customer. This process is time consuming, labor intensive, and prone to human errors in each step. An average tinting takes more than 15 minutes and about five percent of custom tinted paints are mis-tinted and wasted. Obviously, these wastes can be reduced by replacing the human operator with an automatic tinter using electronically stored formula. Spectrophotometer based color matching already involves the use of a computer, allowing easy interfacing with an automatic tinter.

To fill these needs, five U.S. and one foreign manufacturers have introduced automatic tinters during the last several years. These units are generally designed for factory use. They are large, about the size of an office desk, and costly, over ten thousand dollars. Two of these are merely motorized hand tinters. These units dispensing one tint at a time, and are very slow. The most popular ACCUTINTER by Miller Manufacturing Company of Wheeling, Ill. has a set of metering gear pumps. Abrasion by pigments tends to wear the gears and causes loss of metering precision. This unit is very expensive, costing over twenty thousand dollars and also is expensive to maintain because a skilled repairman must come to the store. Also this unit has its own separate central processing unit (CPU), memory, keyboard, and screen, a complete but limited capability computer. This is unnecessary duplication, resulting in additional cost and service needs. It is more practical and economical to shift all control functions, except the minimal safety over-rides, to a more readily available general purpose PC. This arrangement can simplify all interfacing with other retail automation software which is written for PCs.

The accuracy of presently available tinters is in the order of one-sixty-fourth of an ounce mainly because they are designed for tinting a large volume of paint, such as five-gallon pails. This is totally unsuitable for most retail store operations, where quart cans and light pastel colors are a significant portion of their tinting business. In practice, one can tint only a full gallon of pastel color paint since the tinters are not capable of dispensing a smaller amount of tint accurately. The left-over is wasted and becomes a pollutant. For the EcoBatch process, the tinter must be capable of dispensing about one-four-hundredth of an ounce of tint accurately to tint one pint of paint in very light pastel colors and, at the same time, be compact enough to fit into the counter-top space which a hand tinter occupies now. Being unable to find any commercially available tinter which can meet the above strict requirements, the following invention had to be made.

SUMMARY OF THE INVENTION

This invention provides means of simultaneously dispensing plurality of liquids in individually pre-set amounts quickly, reliably, and accurately with minimal cost and space.

This invention relies on an external general purpose digital computer for all controls except the safety related override switch. This invention does not have its own CPU or own memory and uses a commonly available interface card, such as the PIO-12 by Keithley MetraByte Corporation or its equivalent, to communicate with the computer. A computer with software, which any computer programer can write, provides computational capability and accurate and reliable sequential and repetitive control from the stored memory. Presently, this invention is used in combination with an IBM PC (or any compatible MS DOS based computer) and copyrighted software, known as ACCEPT. But the use of this invention is not limited to this particular combination. This invention, the device for actual dispensing of the liquids, can be used with any computer or operating system but one must have software for that particular combination. This invention is a peripheral device like a printer in word processing.

This invention uses a radial symmetry of all mechanical components for compactness, uniformity, flexibility, and ease of servicing. Although theoretically a minimum of only four colors (three primary colors and black) is sufficient to produce every possible color, the paint industry commonly uses a twelve colorant system. Therefore, twelve identical, inter-changeable, five sided tint reservoirs surround a central drive module (CDM) which contains all moving parts and supports the reservoirs. In this arrangement, the reservoir can be easily enlarged by extending the outward dimensions without changing the inner, narrow wall, the critical mating part of the reservoir and CDM. Also increased height of reservoir will not alter the design of CDM in the radial dimension. This allows the use of many common parts among different models with widely varied sizes of reservoirs. At the present, the larger model has 1.5 gallon reservoirs and the smaller model has 1.3 quart reservoirs. This arrangement can be used for any other number of reservoirs with a similar compactness.

In this invention, the fluid reservoirs are injection molded High Density Polyethylene (HDPE) with nearly equal height/radial dimensions to maximize the volume for a given surface area. For the ease of mold building, both the inner and outer wall is straight rather than an arc. Thus, the horizontal cross-section of the reservoir is an equilateral trapezoid. For an easier removal from the male mold, the outer wall has a slight taper and is wider at the top. Two matching side walls are separated by 30 degrees in the twelve reservoir system. The 1.5 gallon reservoir has a height of 9.5 inch, the radial depth, distance between the inner and outer wall, is 8.5 inch. A 25-inch circle includes all twelve reservoirs and is the maximum radial dimension. This is as large a reservoir capacity as any industrial tinting machine, sufficiently accurate to tint a pint of pastel color for retail stores, and yet compact enough to replace a counter-top hand tinter.

The reservoirs, regardless of size or model, have an identical built-in multi-purpose drain on the bottom near the shortest inner wall. This arrangement provides the closest practical distances from the drains to the center of the device while providing spaces for the corresponding pumps. Also for proper drainage, the bottom is slightly higher near the outer wall. The drain has an outer mounting tube which tightly mates with the drain hole on the base plate of the CDM and a concentric inner drain tube which is also the upper valve seat for preventing flow to and from the reservoir. The annular cavity between these two tubes houses a valve spring. Each reservoir is supported by the base plate and held in position by the two adjacent reservoirs on either side, the drain hole in the base plate on the bottom, and the reservoir holder at the top of the shortest reservoir wall. The reservoir can be easily removed from the base plate and CDM simply by loosening a set screw, sliding the holder which is mounted on the corresponding metering tube upward to free the top and pulling the drain tube out from the mating drain hole in the base plate. To prevent leakage from the mating surfaces of the tubes or reservoir drain tubes and the base plate, grooves with O-ring seals or gaskets are used. This arrangement allows the most compact, flexible and accessible multi-reservoir system.

This invention utilizes a double sided tappet flow diverting valve which is molded around the bent head of a common bicycle spoke and mounted through the inner drain tube. Both face of the tappet, the upper and the lower, have the same conical face and the central disk has three identical straight peripheral cutouts to reduce the viscous drag. The remaining part centers and holds the valve spring. When the reservoir is mounted, the excess depth of the drain hole on the base plate becomes a valve cavity and the reduced hole becomes a lower draining valve seat. This cavity is connected to the bottom of the metering tube by an undercut passage with minimal flow restriction. Normally, the spring keeps the lower face of the valve against the drain valve seat and tint flows between the pump and the reservoir freely. When the valve is pulled up, all tint is diverted to the drain. Proper seating and alignment of valve is ensured by the concentric valve spring and the long vertical valve stem. The upper threaded end of the valve stem is connected to a adjustable spoke nut which is held by a valve compensator which, in turn, is connected to an armature of lifting solenoid by a removable wire pin.

The compensator is a pre-compressed spring holding the nut up against the cage. The compensator lets the solenoid bottom and the valve shut properly regardless of the variation in the length of the valve due to the differences in thermal elongations of the connecting members of the valve assembly or minor difference in the adjustment of the nut. A completely bottomed solenoid has the best service life, strongest pull, and least buzzing. The compensator spring must be stronger than the valve spring but weaker than solenoid pull. To improve the service life of the solenoids, the solenoid voltage is reduced during holding. Although the valve travels only one eighth of an inch for a fast diversion, a deep spring cavity for a long spring is preferred to minimize the solenoid pull required. A valve lock, which spans across and locks on the tops edges of the reservoir side walls along side the shortest wall, lifts up the valve compensator and closes the bottom of the reservoir completely. A slot in the middle of the lock holds the valve stem and prevents an accidental slip of the valve. A reservoir with the valve locked can be easily removed from CDM, transported and placed on a level flat area near an edge where the drain tube overhangs and is free from any damaging contact.

This invention has a central drive module (CDM) which translates all computer instructions into motion. Its maximum horizontal dimension is 12 inch by 12 inch square and is common to all models. This dimension is primarily dictated by the size of the metering tube which is about ¾ inch O.D. The height of CDM for the previously mentioned 1.5 gallon unit is only 27 inches. This module weighs only about 50 pounds. This affords us easy handling and shipping for overnight replacement and servicing nationwide from a single central location by using UPS Overnight Service. As all moving and likely wearing parts are consolidated in the CDM, only this module needs service. The base plate has four mounting holes (one on each corner) for mounting on a stand. On the lower side of the base plate, a round nozzle plate is mounted by four tie bars. On the top side, twelve substantially identical precision electro-polished stainless steel metering tubes, each with a small cutout on the lower ends for tint flow, are implanted into mating tube holes and surround a single reversible D.C gear motor which has an integral Hall-effect rpm counter. The top ends of the tubes are securely held in parallel in stepped holes in a circular plate. This top plate also supports twelve solenoids. The top ends of four tie bars pull the top plate in place against the uniform support of twelve tubes. Another plate is driven by a lead screw and the motor between two vertical preset positions on the slide which is mounted on the top of the top plate. Twelve substantially identical sets of stirrers and pistons are mounted on and driven by this drive plate. Thus a single motor powers all mixing and pumping.

Above the top plate, two boxes house six sets of rectifiers each for their corresponding solenoids. One of them also contains a magnetic pick-up which senses a magnet on the drive plate and sends homing signal to the computer. The AC power lines to the rectifiers, the homing signal lines, and the solvent heater line pass through the conductor hole on the top plate and join the lines from the motor and the counter. All these lines pass through a large center hole on the base plate and the passage between the bottom side of the base plate and a groove on the top face of the nozzle plate, and connect to the control box.

Tints are viscous liquid dispersions of solid pigment particles in ethylene glycol with polymeric thickeners and other minor components and thus have very complex non-Newtonian rheological properties. Some tints are visco-elastic and thixotropic. The best way of metering these fluids is to use a simple piston type positive displacement pump. For accurate measuring and repeatable dispensing, elimination of air entrapped in the tint is extremely important. A positively bottoming, closely fitting, brass piston with a pair of elastomeric cup seals removes all trapped air around the piston. The screwed pair of seal holders and the large piston hole on the top plate let one replace the seals simply, without taking apart other parts in CDM. Plastic washers cover the top of the tubes around the piston rods to keep out dust.

This invention assures a uniformity of tint by mixing the tints with pumping and stirring actions and by positively preventing the evaporative loss of solvents. Every time the drive plate moves to the top and returns to home position at the bottom, all tints are pumped and stirred. A periodic automatic mixing is easily programmed into the control software. The normal path of returning the tint to the reservoir effectively mixes near the drain. As the stroke of the pump is considerably longer than the height of the reservoir, the lift of the stirrer is shortened by adding a distance between lower C-clip and the upper removable pin on the rod. To improve the gross circulation of tint in this particular shape of the reservoir, the holes for stirrer rods on the drive plate are slightly enlarged to enable a slanted stirrer paddle to move in, out, or side ways. The outwardly slanted paddle is slightly smaller than the inside cross-section of the reservoir. To improve the flow near the valve a small cut out is made at the middle of the narrowest side. Also a thin narrow wiper blade is attached to the middle part of the outer edge of the paddle. During the up stroke, the resisting tint on the top side pushes the paddle inward and flows down outwardly but during the down stroke, the trapped tint pushes the paddle outward and flows up inner side through the cutout. The outward and downward motion of the paddle scrapes the outer wall for more uniform stirring and the wiper cleans the part of wall and shows the tint level through the translucent HDPE reservoir wall. The limited travel and the slant of the paddle prevent air entrapment, thus assuring uniform tint density which is very critical in volumetric tint metering. It should be noted that the biggest reason for not using this reservoir shape by others was that the common rotating vertical paddle can not avoid creating dead caking zones near the outer corners. This invention effectively solves this problem.

Regardless of a perfect mixing and stirring, evaporation changes overall tint strength. The evaporative loss will become more critical when present solvents (hazardous glycols) are banned by the Clean Air Act of 1990 and the only practical replacement, water, is used. Water has much higher vapor pressure and dries faster. This invention prevents the evaporation with a combination of outward partial lids which open easily for resupplying tints, a cover which encloses the CDM, the stirrers, and the open inner parts of the reservoirs for valves and stirrers movements, and a small solvent cup, with a tiny submerged electric resistance heater, which is placed the inside the enclosure. A controlled evaporation of solvent from the cup saturates inside of the enclosure and thus prevents evaporation of the solvent from the reservoir. A trimming resistor, the simplest adjustable power supply, on the heater line optimizes the evaporation from the cup. The most accessible place for this cup is on top of the drive plate. A soaked open cell foam in the cup can prevent spillage.

This invention achieves an extremely accurate simultaneous dispensing by timed diversion of tint flow during the steady down stroke of the drive plate. The travel of the drive plate is very accurately monitored by counting the electric impulses from the Hall effect sensor which are triggered by rotation of the motor. The counts per distance or volume can be easily increased by using a smaller pitch lead screw or by increasing the number of magnetic poles on the magnet disk. Regardless of each individual dispensing volume, the drive plate travels to preset position or to a preset counts and then reverse the direction. When the down stroke attains a constant speed, the preassigned solenoid(s) pulls up the valve(s) and diverts the tint flow(s). If the assigned counts are larger than a single stroke can provide, the process repeats till the total preassigned counts are reached. The diversion must occur during the constant speed. In the present design, the ¾ inch tube with 10 inch stoke gives about two ounces of tint and about ten thousand counts. Thus, a count represents one five thousandth of ounce.

Before this device is put into service, like any other precision instrument, this must be calibrated for the maximum attainable accuracy. The calibration involves accurate determination of a pair of numbers: count per volume and the additional counts needed to account for transient delay. Since the first is related only to the mechanical characteristic of the tube, rpm counter, and lead screw and is independent to fluids, the counts per volume is fixed for a given tube. The most accurate method of determining this number for a give tube is by weighing water dispensed. The second value depends on the transient behavior of solenoid pull, inertia of armature/valve, springs and drag by tint flow. This value is determined by plotting count (x) vs. amount (either by volume or by weight) of tint dispensed (y) for various amounts and by determining the count shown by the intersection of the the best straight line passing through all points and the x axis. This value is added to the volumetric count to compensate for delays in the diversion. The deviation of individual points from the best straight line represents the accuracy of that dispenser for random errors. The slope of the line represents the first value, counts/volume. This method is based on the assumption that the cross sectional area of the tube and transient delay is constant irrespective of the duration of the diversion. We have verified this assumption experimentally. Since the effect of the viscosity difference on the delays are negligible, actual calibration is performed automatically by weighing dispensed water with an electronic digital balance. A PC with custom software runs this calibration automatically and the values of slope and intercept are routinely incorporated into each ACCEPT config.dat file for that particular CDM.

The nozzle plate provides twelve shortest practical individual fluid passages between each corresponding base plate drain on the top side to circularly arranged corresponding nozzle around the center on the bottom side. Since the tint holes of some base paint containers are only two inches in diameter, dispensing into these holes without spillage requires that the nozzles be close together. The shape and the size of the nozzles are critical to the accuracy of dispensing because the forming or breaking off of a tint icicle is the largest source of random error. The nozzle must be circular, small in diameter, short, and have a sharp exit corner. Closing the diverting valve quickly causes a surge in the tint flow, creating a "spitting" which prevent icicles and accurately duplicate every discharge. To protect the sharp corners and to make the vertical passage of nozzle short, a 2 inch round recess is made in the center of nozzle plate. A flexible magnetic cover seals this recess tight and prevents drying and caking of tints in the nozzles by sticking to a thin steel washer which is glued permanently around the recess. For more positive prevention, a small center hole through the nozzle plate supplies the saturated vapor from the above enclosed space. It is very important to seal this cavity when the unit is not dispensing. To improve the visibility and handling of the magnetic nozzle cover a vertically hanging plastic tag is attached to one corner of the square cover. This also prevents one from placing a container in the dispensing position without removing the cover. Twelve soft gaskets prevent leakage of the passages at the interface of the two plates. The twelve radial passages from the bottom of the drain to the top of the corresponding nozzles are made by drilling horizontal tapered holes from the outer rim and plugging the entrances of the holes. The groove on the top side of the nozzle plate provides a passage for a bundle of electric conductors from the CDM.

Finally, the accurately metered tints must be dispensed into various commercially available containers, which have different sizes, heights and openings. This invention can accept any size container up to a five-gallon pail using the standard stand. For larger drums, the stand must be modified. A shelf with clearly marked concentric outlines for gallon and quart cans raises the can close to the nozzles. Smaller cans can be placed accurately at the middle of the smaller circle. The control box which is mounted on the backside of the stand, prevents a can from being accidentally pushed off the back of the shelf. The control box is explosion proof, and houses standard purchased electronic components, such as a power supply, a DC motor control, and relays for the solenoids. The box also supplies power to the heater and provides connection to the interface board by a standard connector cable. Additionally, the stand has a switch for start and emergency stop. The tubular structural member provides a cable passage and protects the switch and the connecting wires.

For accurate placement of various five-gallon pails, which have nearly uniform diameter, but widely varying sizes and location of tint hole, this invention uses a two piece hole guide. A three prong steel clamp holds the pail cover securely and a movable guide board is screwed to the two hooking prongs. The board has a two inch hole, two slots for the screws and guiding edges. The relative positions of the edges and the hole match the outlines of the actual vertical objects which are mounted on or are part of the stand and the center of the nozzle circle, respectively. If the clamp is placed in line radially with the tint hole in a pail lid, the board can be adjusted so it's guide hole is directly over the tint hole. When the screws are tight, simply pushing the pail until the guide edges contact the control box automatically lines up the tint hole to the nozzles. As the next pail is most likely from the same supplier, no frequent adjustment is needed. This type of hole guide can be used with any tinter.

In one embodiment, this invention is incorporated into a self-contained computer controlled automatic tinter which contains working components which are described hereto. Further objects and advantages of my invention will become apparent from a consideration of the drawings and ensuing description thereof.

DESCRIPTION OF THE PREFERRED EMBODIMENT

Figure 1:
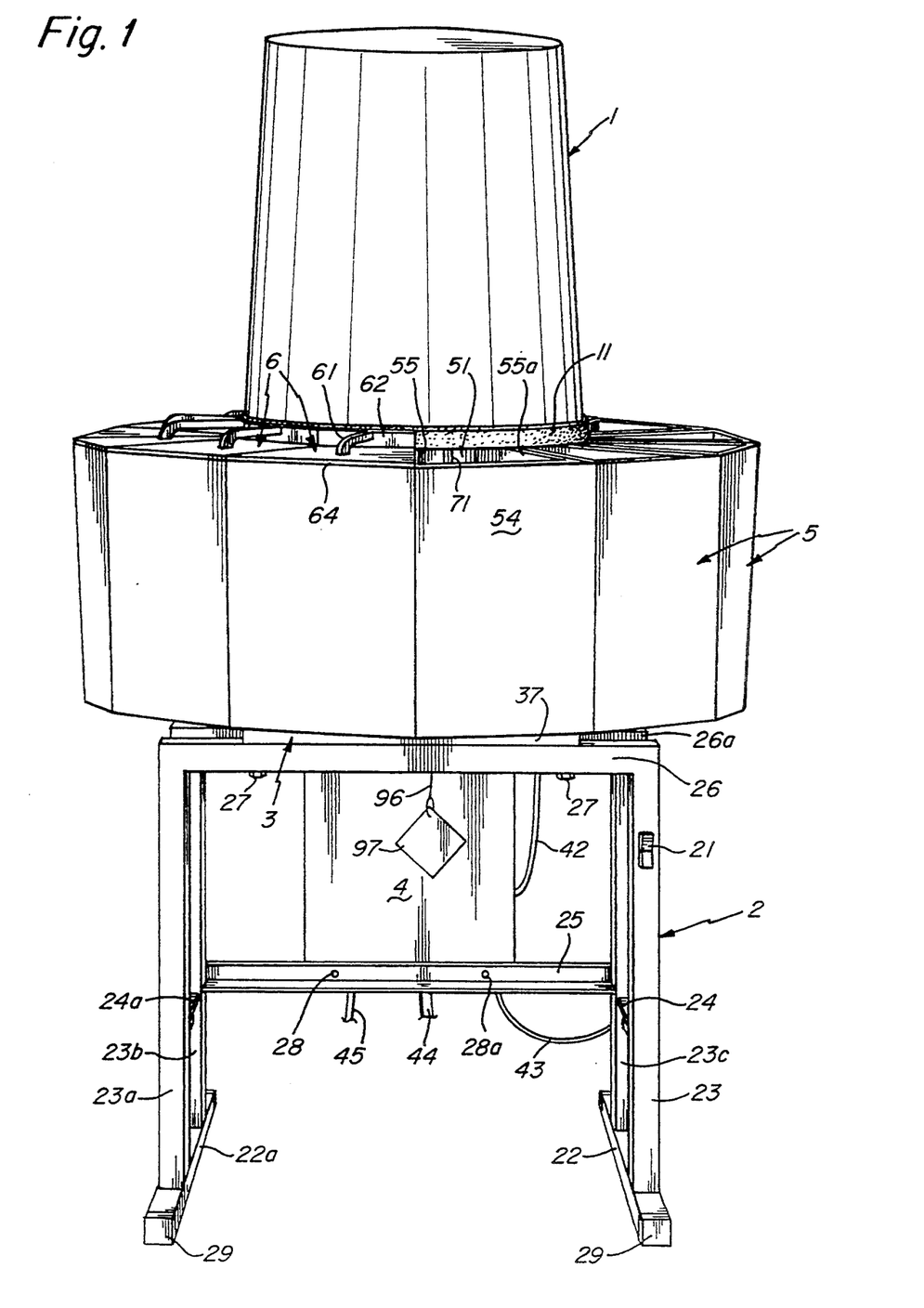
FIG. 1 is an overall pictorial front view of the present invention.
Figure 2:
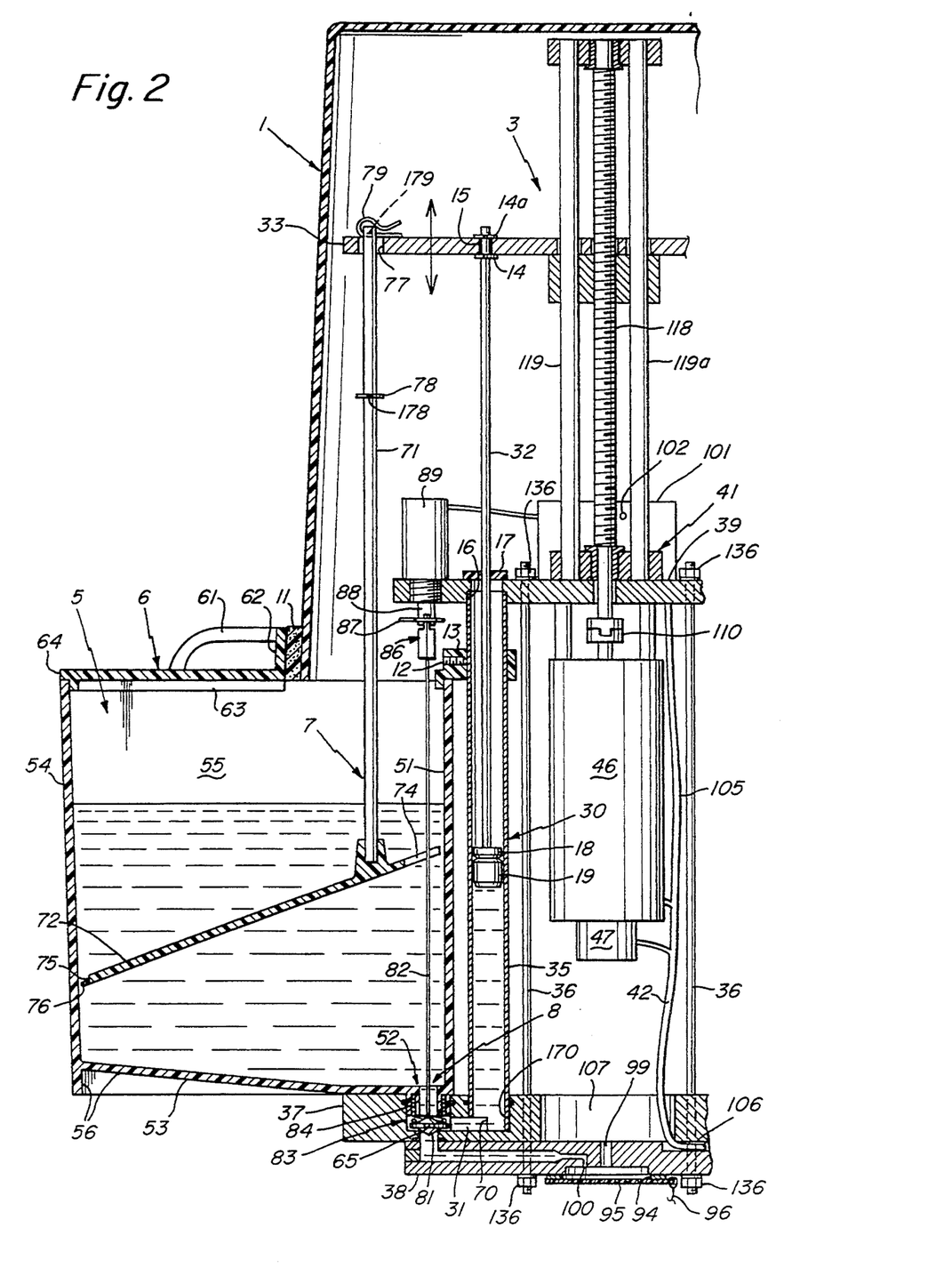
FIG. 2 is an enlarged radial sectional view of FIG. 1 with additional details of the central drive module (CDM) and other internal moving parts. For the illustration, only one among twelve identical sets is shown and numbered.
Figure 3:
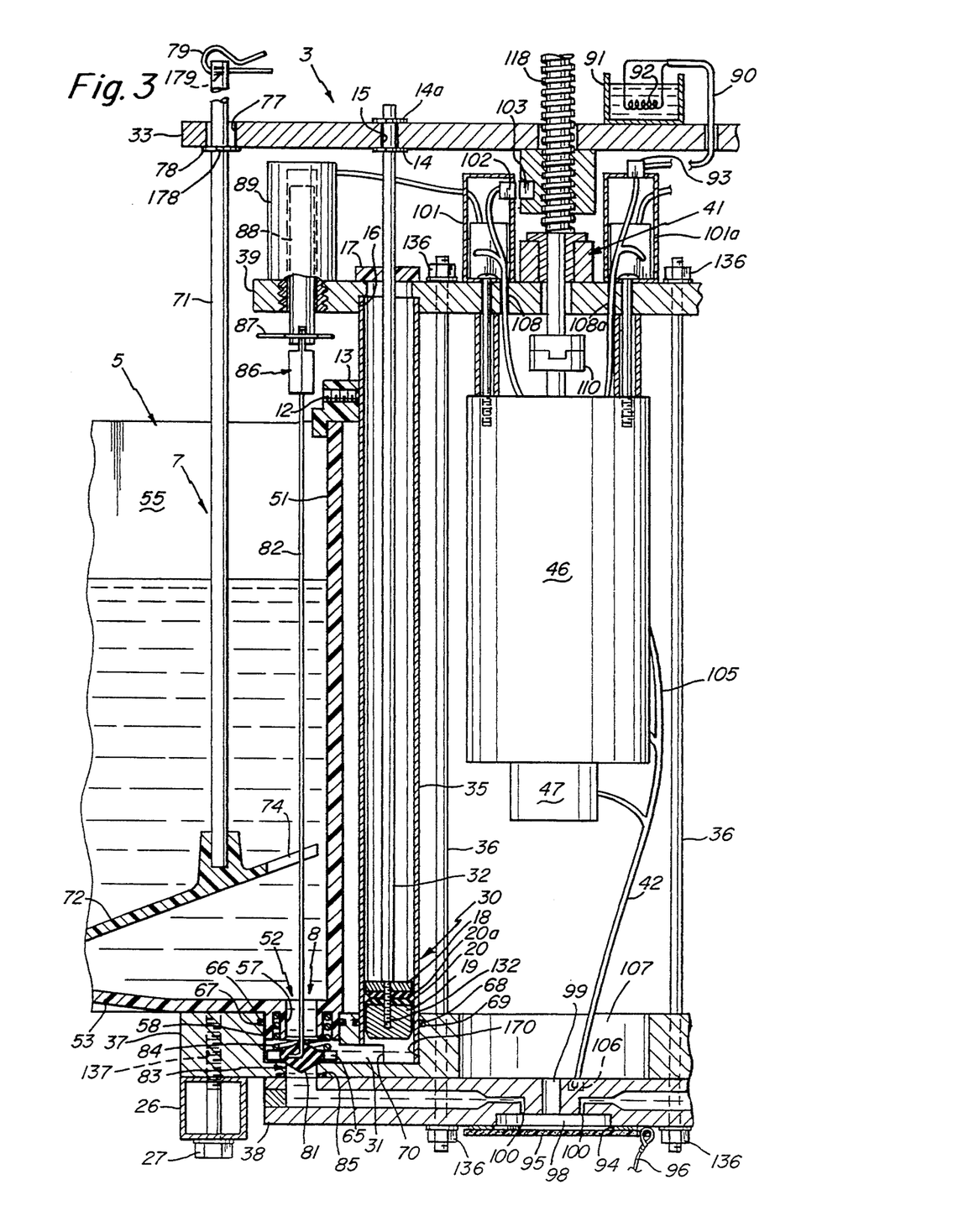
FIG. 3 is a further enlarged view of the CDM of FIG. 2. However, this view is at a right angle to FIG. 3 and each number represents the corresponding parts of the identical set at 90 degree apart.

Referring to FIG. 1, for over all arrangement and FIG. 2 and FIG. 3 for detail, an automatic tinter of this invention is shown generally comprised of a cover 1, a stand 2, a central drive module 3, a control box 4, and twelve sets of substantially identical reservoirs 5, lids 6, stirrers 7 and valve assemblies 8. All components can be easily replaced with a simple set of four hand tools, a half-inch open end and two Allen wrenches and a flat head screw driver.

The molded plastic cover 1 sits on the top of practically all radial reservoir walls 55 and 55a and has a ½ inch wide closed cell foam band 11 which is glued around the outer surface of its base. The injection molded HDPE lid 6 has a handle 61 for easy removal for resupplying tints, a raised arc-shaped wall 62 which centers the cover 1 by sealing against the foam band 11 and thin skirt 63 which fits in and seals against the inside wall and the a narrow extension 64 of the lid 6 covers and seals the top of the reservoir wall. Twelve lids 6 and the cover 1 enclose all moving parts for safety, keep the solvent vapor in the enclosed space, and keep dust out.

Figure 6:
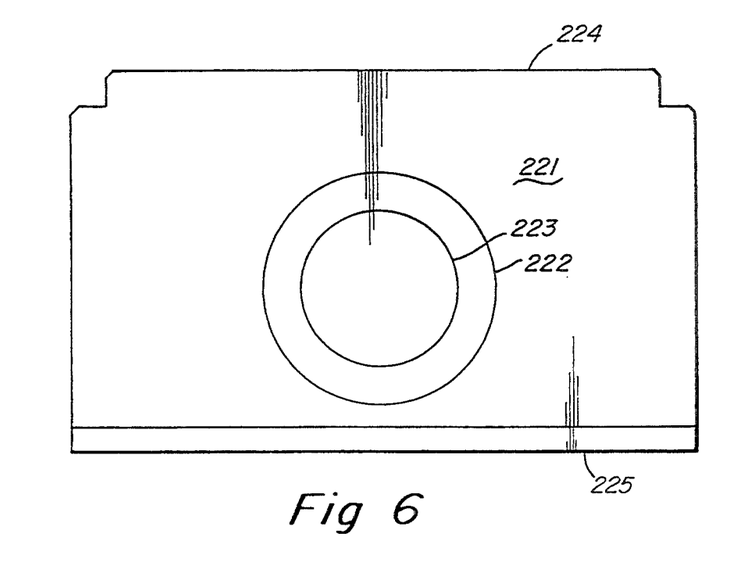
FIG. 6 is a top view of the shelf.

The CDM and twelve reservoirs directly and the stirrers 7 and the valve assemblies 8 indirectly are supported by a 12 inch square base plate 37 which is the only visible part of the CDM in FIG. 1. A stand 2 is welded from eight pieces of one-inch square steel tubing, a brace 25 (a 16 inch long ¾ inch by ¾ inch by ⅛ inch steel angle) and two short pieces of the angle 24 and 24a. The tow bottom tubes 22 and 22a are 18 inch long and 16 inch apart and make an 18 by 18 inch foot print. The four legs 23 through 23c are about 16 inch high to clear a five-gallon pail. Four end caps 29 cover the tube ends. The brace 25 has two tapped screw hole 28 and 28a for screws for mounting the control box 4. Two more screws are used on the back face of the tube 26a. The front leg 23 has an over-ride switch 21. The connecting wires 43 pass through the insides of tubes 23, 22, and 23c and two holes on the top of tube 22 and one on the back of 23c for protection. The brace 25 and the angle pieces 24 and 24a support a shelf which is shown in FIG. 6. Four 5/16 inch bolts 27 hold the CDM on the top of the two upper tubes 26 and 26a. The stand is tested for a five hundred pound load. The control box 4 can be easily removed from the stand 2 for service simply by unplugging power line 45, the cable 44 to the computer, the line 43 to the over-ride switch 21 and the cable 42 to the CDM 3 and by removing the four mounting screws.

The injection molded HDPE tint reservoir 5 has an inner narrow wall 51, a slightly tapered outer wall 54, and two side walls 55 and 55A, and a slanted bottom 53 for drainage. The dimensions on the 1.5 gallon model were given previously. The walls form a horizontal equilateral trapezoid. The extension 56 of the walls below the bottom 53 supports the reservoir on a level surface. A drain 52 has two concentric tubes. The inner tube 57 provide the upper valve seat for the double faced tappet diversion valve 81 and the outer tube 58 mates tightly with the drain hole 83 which provide a valve cavity and a bottom valve seat at the reduced end. A valve spring 84 is housed in the annular space between the two tubes. A thin annular gasket 85 seals the drains between the base plate and the nozzle plate. A reservoir holder 13 and a setscrew 12 secure the reservoir firmly in place.

The valve assembly 8 consists of a double sided tappet flow diverting valve 81 which is molded around the bent head of a common bicycle spoke 82 and mounted through the inner drain tube 57. The tappet 81 has the same conical faces on both sides and a central disk between them. The disk has three identical straight peripheral cutouts 65 to reduce the viscous drag. The remaining part centers and holds the valve spring 84. The valve cavity is connected to the bottom of the metering tube by the undercut passage 31 with minimal flow restriction. Normally, the spring 84 pushes the lower face of the valve 81 against the lower valve seat and tint flows between the pump 32 and the reservoir freely. When the valve is pulled up, all tint is diverted to the drain 83. Proper seating and alignment of valve is ensured by the concentric valve spring 84 and the long vertical valve stem 82. An O-ring 66 in groove 67 seals the outer drain tube 58.

Figure 4:
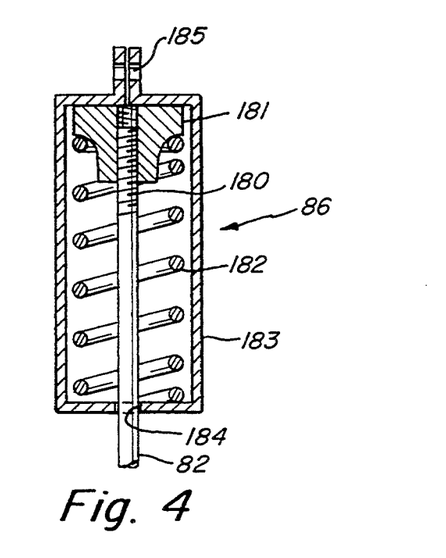
FIG. 4 is a sectional view of the valve compensator.

Referring to FIG. 4 for detail, the upper threaded end 180 of the valve stem 82 is connected to an adjustable spoke nut 181 which is held by a pre-compressed valve compensator spring 182 which, in turn, is held in a cage 183. The sheet metal cage 183 has a center hole 184 for the stem 82 and a pair of holes 185 on the ends which are connected to an armature 88 of the lifting solenoid 89 by a removable wire pin 87. The compensator 86 lets the solenoid armature bottom and the valve shut properly. The valve 81 travels only one eighth of an inch for a fast diversion.

Figure 5:
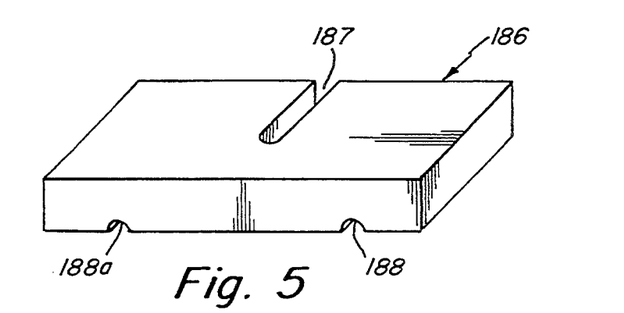
FIG. 5 is a perspective view of the valve lock.

Referring to FIG. 5, an injection molded plastic valve lock 186 spans across the both tops of both of the reservoir side walls 55 and 55a by locking them in the grooves 188 and 188a, respectively, along side the shortest wall 51, and lifts the cage 183 by catching the stem 82 in the slot 187 closing the bottom of the reservoir completely. A reservoir with locked valve can be easily removed from the CDM by loosening the setscrew 14, sliding the holder 13 up, and pulling out the drain tube 57. It can be transported and placed on a level flat area near an edge where the drain tube overhangs and is free from any damaging contact.

Referring to FIG. 2 in particular, a stirrer 7 has a ¼ inch stainless steel rod 71, a injection molded HDPE paddle 72 on one end, a C-clip 78 in groove 178 and a removable wire pin 79 through the hole 179 at the other end. As the stroke of the pump is considerably longer than the height of the reservoir, the lift of the stirrer is shortened by adding a distance between C-clip 78 and the upper removable pin 79. To improve the gross circulation of tint in this particular shape of the reservoir 5, the holes 77 for stirrer rods 71 are slightly enlarged to enable the slanted stirrer paddle 72 to move in, out, or side ways. The paddle 72 is an equilateral trapezoid and slightly smaller than the inside cross-section of the reservoir 5. To improve the flow near the valve a small cutout 74 is made at the middle of the narrowest side. Also a thin narrow wiper blade 76 is attached to the middle part of the outer edge 75 of the paddle. During the up stroke, the resisting tint on the top side pushes the paddle inward and flows down outwardly but during the down stroke, the trapped tint pushes the paddle outward and flows up the inner side through the cut out 74. The outward and downward motion of paddle scrapes the outer wall for more uniform stirring and the wiper cleans part of wall 54 and shows the tint level through the translucent reservoir wall 54. Although the computer keeps an accurate account of tint and warns of a low tint level, this is always visible. Every time the drive plate 33 moves to the top and return to home position at the bottom, all tints are pumped and stirred. A periodic automatic mixing is easily programmed into the control software.

Referring to FIG. 3, a central drive module (CDM) pumps, mixes and dispenses tints by converting the instructions from the computer into corresponding motion. Thus, the CDM is comprised of both electro-magnetic and mechanical components. The electro-magnectic members include a reversible DC gear motor 46, an integral Hall-effect rpm counter 47, twelve substantially identical D.C. solenoids 89, and a magnetic pick-up for home position 102. The computer controlled relays in the control box 4 supply the power to the solenoids and the motor via cable 42. The AC power to the solenoids is rectified by six bridge rectifiers each in two rectifier boxes 101 and 101a. The box 101 also contains a magnetic pick-up 102 which senses the magnet 103 on the drive plate 33 and sends a homing signal to the computer. The magnetic pulse from the counter 47, about one thousand counts per inch of travel by the drive plate is sent to the computer. A bundle of wires 105, including the AC lines to the rectifiers, the homing signal lines, and the solvent heater line, passes through the conductor holes 108 and 108a on the top plate 39 and joins the lines from the motor and the counter. These lines pass through the large center hole 107 of the base plate 37 and the passage between the bottom side of the base plate and a groove 106 on the top face of the nozzle plate 38, and connect to the control box 4.

The mechanical parts include four anodized aluminium plates, a slide 41 and twelve substantially identical metering pumps. The 12 inch square base plate 37 has four tapped 5/16 inch mounting holes 137 on each corner for mounting on a stand 2 by four mounting bolts 27. A 4 inch hole 107 in the middle of the plate provide easy access to the motor and a passage for the cable 42. On the lower side, a round nozzle plate 38 is mounted by four tie bars 36 and nuts 136. On the top side, twelve substantially identical precision electro-polished stainless steel metering tubes 35 with a ¼ inch cutout 70 for a fluid passage to the undercut 31 are planted into mating tube holes 170. The tube 35 is sealed around by an O-ring 68 in the groove 69. The top ends of the tubes are securely held in parallel in a stepped hole 16 in the circular top plate 39. This plate also supports the solenoids 89, the slide assembly 41, the motor 46, and the two rectifier boxes 101 and 101a. The top ends of the four tie bars 36 pull the top plate in place against the uniform support of the twelve tubes 35. A ¼ inch thick round drive plate 33 is driven between two vertical preset positions on the slide by a lead screw 118 which is rotated by the motor. A coupler 110 connects the lower end of the lead screw 118 to the motor shaft. Two parallel ¾ ground steel shafts 119 and 119a keep the drive plate perpendicular. This drive plate has a set of twelve ¼ inch holes 15 for piston rods 32 which are fixed tightly by two C-clips 14 and 14a and another set of slightly larger holes 77 for sliding stirrer rods 71. Thus a single motor powers all mixing and pumping. The lower threaded end 132 of the piston rod 32 holds the brass upper 18 and lower 19 pistons, which hold two elastic cup seals 20 and 20a, which can be easily replaced by removing the clip 14, pulling the piston out of the tube, and unscrewing the lower piston 19. The piston almost bottoms to prevent air trapping.

The nozzle plate 38 provides twelve shortest practical individual fluid passages between each corresponding base plate drain 83 to a circularly arranged corresponding nozzle 100. To dispense into the small tint holes of some paint container lids without spillage, the nozzles are put close together, within a one-inch circle. The nozzles 100 have 0.10 inch diameter and 0.10 inch depth. A 2-inch round recess 98 protects the nozzles 100, make them short, shortens the length of nozzles, and provides a space between the nozzles and the square flexible magnetic cover 95. A very thin steel washer 94 is glued around the recess 98 to provide an air tight magnetic seal on aluminium plate 38. For more positive prevention of caking in nozzles, a small center hole 99 can pass the saturated vapor from the above enclosed space. It is very important to seal this recess when the tinter is not in use. To improve the visibility and removal of the cover 95 a string 96 with a plastic tag 97 is attached to one corner of the square cover. The tag 97 interferes with the placement of container in the dispensing position when the cover 95 is not removed.

For positively preventing the evaporation of tint solvents, a solvent cup 91 and a tiny submerged ceramic resistor 92 is used to heat the solvent and to saturate the enclosed space with the solvent vapor. To control the rate of evaporation, a variable resistor, 93 is connected to the heater 92 by the line 90.

Referring to FIG. 6, a ¼ inch thick shelf 221 supports a paint can while tints are dispensed. For accurate placement, two concentric circles 222 and 223 indicate the outlines of a gallon and a quart can, respectively. The smaller circle helps to center even smaller cans. The back edge 224 rests on the ¾ inch angle iron 25 between the two back legs of the stand 2, and the front edge which is re-enforced and protected by a U-shaped stainless steel trim 225 rests on two supports 24 and 24a.

Figure 7:
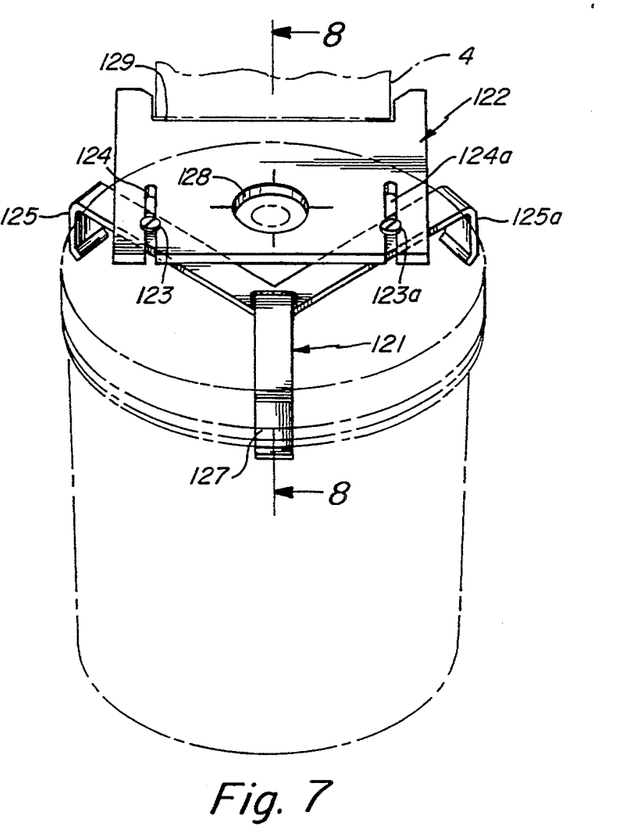
FIG. 7 is a perspective view of the hole guide.
Figure 8:
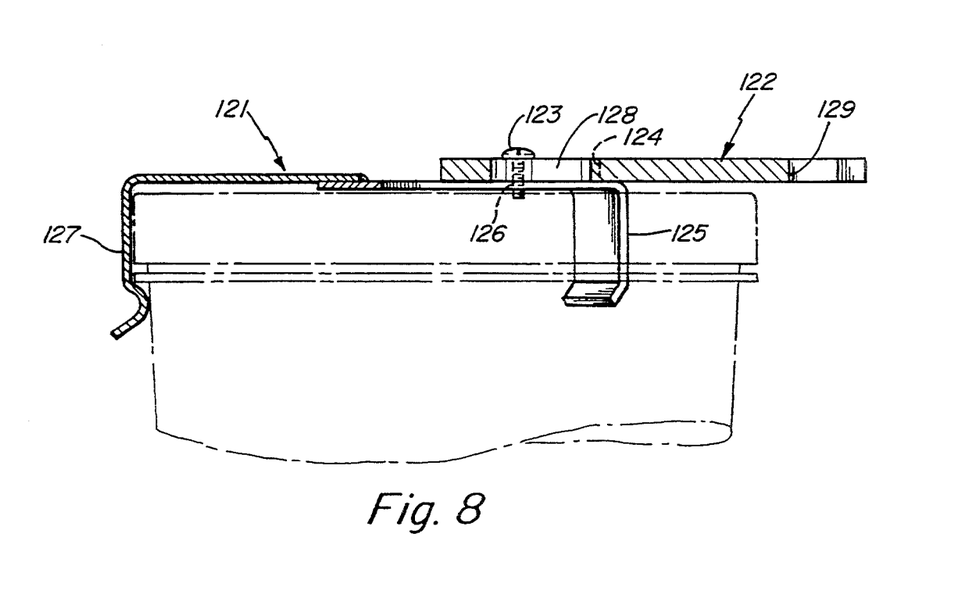
FIG. 8 is a sectional side view of the hole guide of FIG. 7 taken along line 8—8 of FIG. 7.

Finally, referring to FIG.7 and FIG.8, a hole guide for five-gallon pails consists of a steel clamp 121, a movable guide board 122 and two wide head screws 123 and 123a. The clamp has a pair of hooking prongs 125 and 125a with tapped screw holes 126 (shown only one) and a locking prong 127. The board 122 has a 2-inch hole 128, a guiding edge 129 and a pair of slots 124 and 124a for the screws 123 and 123a, respectively. Detailed instructions for use of the hole guide as well as center lines for the hole are printed on the board. To clamp, one hooks the pail cover with the two hooking prongs 125 and 125a in the correct radial direction and pushes down the locking prong 127. To adjust the hole 128 radially so it lies directly over the tint hole of a pail lid, one loosens the screws 123 and 123a, slides the board 122, matches the two holes and tightens the screws. When the pail with a properly adjusted hole guide is pushed against the control box 4 and the guiding edge 129 mates the wall of the control box 4, the nozzles line up with the tint hole automatically. To unclamp, one simply lifts the locking prong 127 up.

It is understood that the preceding description is given merely by way of illustration and not in limitation of the invention and that various modifications may be made thereto without departing from the spirit of the invention as claimed.

I claim:

1. An automatic computer-controlled device for dispensing a plurality of fluids in preset amounts, comprising:

a plurality of substantially identical sets each having a piston-actuated pump, a fluid reservoir, a stirrer within said fluid reservoir, and a flow diversion valve for directing fluid from said reservoir to said pump;

each of said fluid reservoirs being open to each other through a space common to each of said fluid reservoirs to allow the passage of vapors between each of said fluid reservoirs and said common space;

each of said sets are in fluid communication with a respective dispensing nozzle;

means for holding said plurality of substantially identical sets;

means for moving said pistons of said pumps and said stirrers between two preset vertical positions in unison;

means for controlling said diversion valve for dispensing; and means for simultaneously dispensing fluid from any number of said substantially identical sets into a container.

2. The device of claim 1, wherein said fluid reservoir has a substantially trapezoidal cross-section and an integral drain tube.

3. The device of claim 2, wherein said stirrer has a rod and a paddle, said paddle is secured at an angle to said rod.

4. The device of claim 3, wherein said paddle has a trapezoidal face.

5. The device of claim 4, wherein said paddle has a cutout in the middle part of the shortest side to improve upward flow during decent of said paddle.

6. The device of claim 5, wherein said rod passes through a stirrer hole on a drive plate, and adjustable stops are secured on said rod on either side of said drive plate spaced from said stirrer hole.

7. The device of claim 5, wherein said paddle has an extension partially along the outer edge for wiping the reservoir wall during downward motion.

8. The device of claim 1, wherein said means for moving comprises:
a drive plate having a plurality of holes for receiving said pistons and said stirrers;
a motor for moving said drive plate;
means associating said pistons and said stirrers; and
said holes for receiving each of said stirrers having a diameter greater than the diameter of each of said stirrers received therein thereby permitting said stirrers to move laterally.

9. The device of claim 8, wherein said motor is a reversible DC motor with Hall effect rpm counter.

10. The device of claim 8, wherein said means associating each of said pistons and each of said stirrers comprises a first stop and a second stop positioned on each of said stirrers on either side of said drive plate such that said drive plate can only engage one of said stops at a time.

11. The device of claim 10, wherein said stirrer passes through said receiving hole at a non-orthogonal angle to said driving plate.

12. The device of claim 11, further including a stirrer paddle secured to said stirrer at a forward slant, said paddle having a cut out for passage of fluid therethrough.

13. The device of claim 10, wherein the position of said second stop on said stirrer may be adjusted.

14. The device of claim 8, further including a homing magnetic pick-up and associated magnet on said drive plate.

15. The device of claim 1, further including means for preventing evaporation losses, comprising:
a solvent cup, a small variable heater, and means for saturating the interior of said reservoir with vaporized solvent to inhibit evaporation of the fluid.

16. The device of claim 15, wherein a vapor passage is in fluid communication with said solvent cup and said reservoir interior.

17. The device of claim 1, further including a means for aligning a can below said dispensing nozzles said means including,
a stand;
a shelf with concentric circles for receiving the can below a nozzle plate which includes said dispensing nozzles; and
a hole guide for the can.

18. The device of claim 1, further including a solenoid;
a drive plate having means for receiving said stirrers and said pistons;
a top plate having means for receiving said solenoids and said pistons;
a base plate having means for receiving said pistons;
said base plate also has drain holes and undercut passages;
each of said means for receiving said pistons are substantially aligned; and
a nozzle plate supporting said dispensing nozzles.

19. The device of claim 18, wherein said means for controlling comprises:
said solenoids;
a valve assembly including a double faced tappet valve, stem, a valve compensator, and a valve return spring;
upper and lower valve seats;
excess depth of drain for a valve cavity; and
undercut flow passages.

* * * * *